Dec. 15, 1959
S. R. FUREY
2,917,258
FISHING ROD CRADLE
Filed Dec. 28, 1955
3 Sheets-Sheet 1
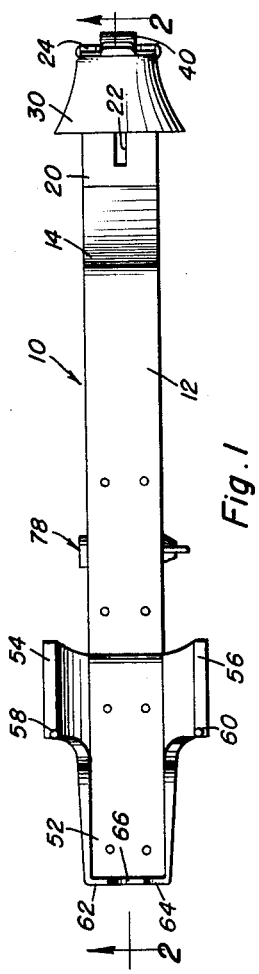
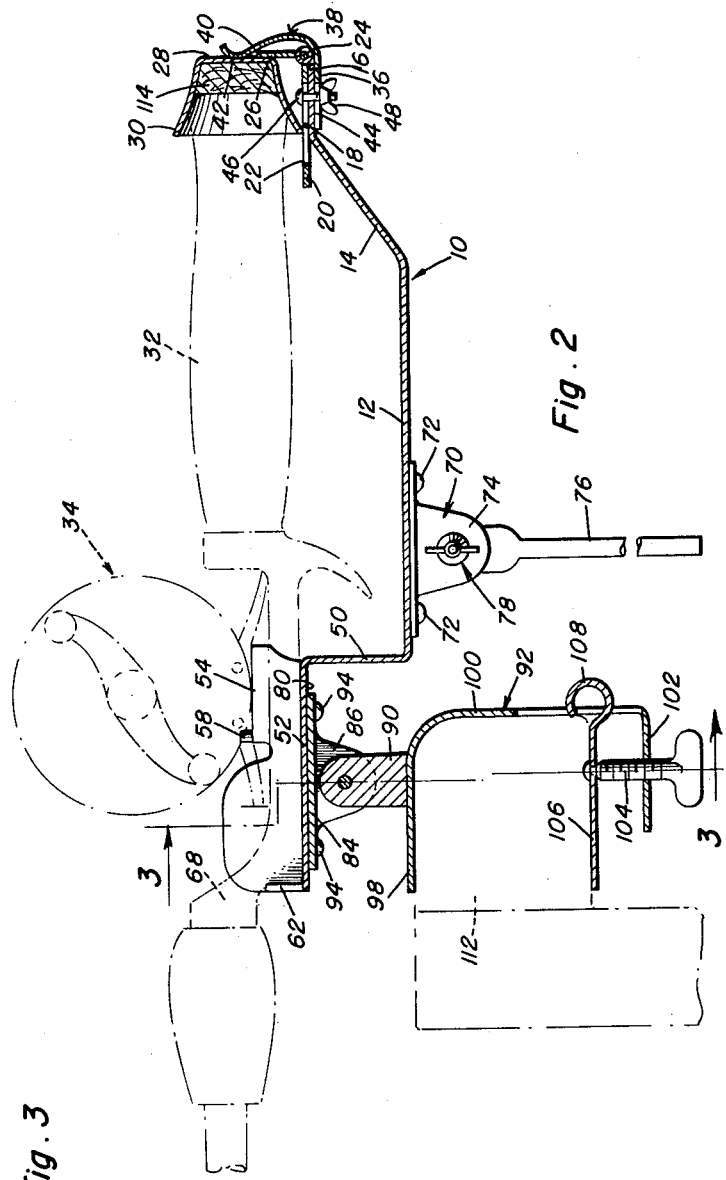
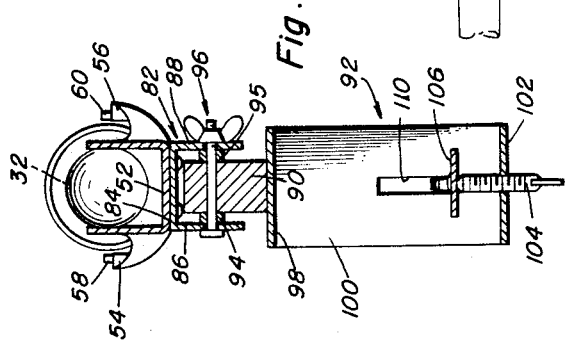
Stanley R. Furey
INVENTOR.

Dec. 15, 1959     S. R. FUREY     2,917,258
FISHING ROD CRADLE
Filed Dec. 28, 1955     3 Sheets-Sheet 2
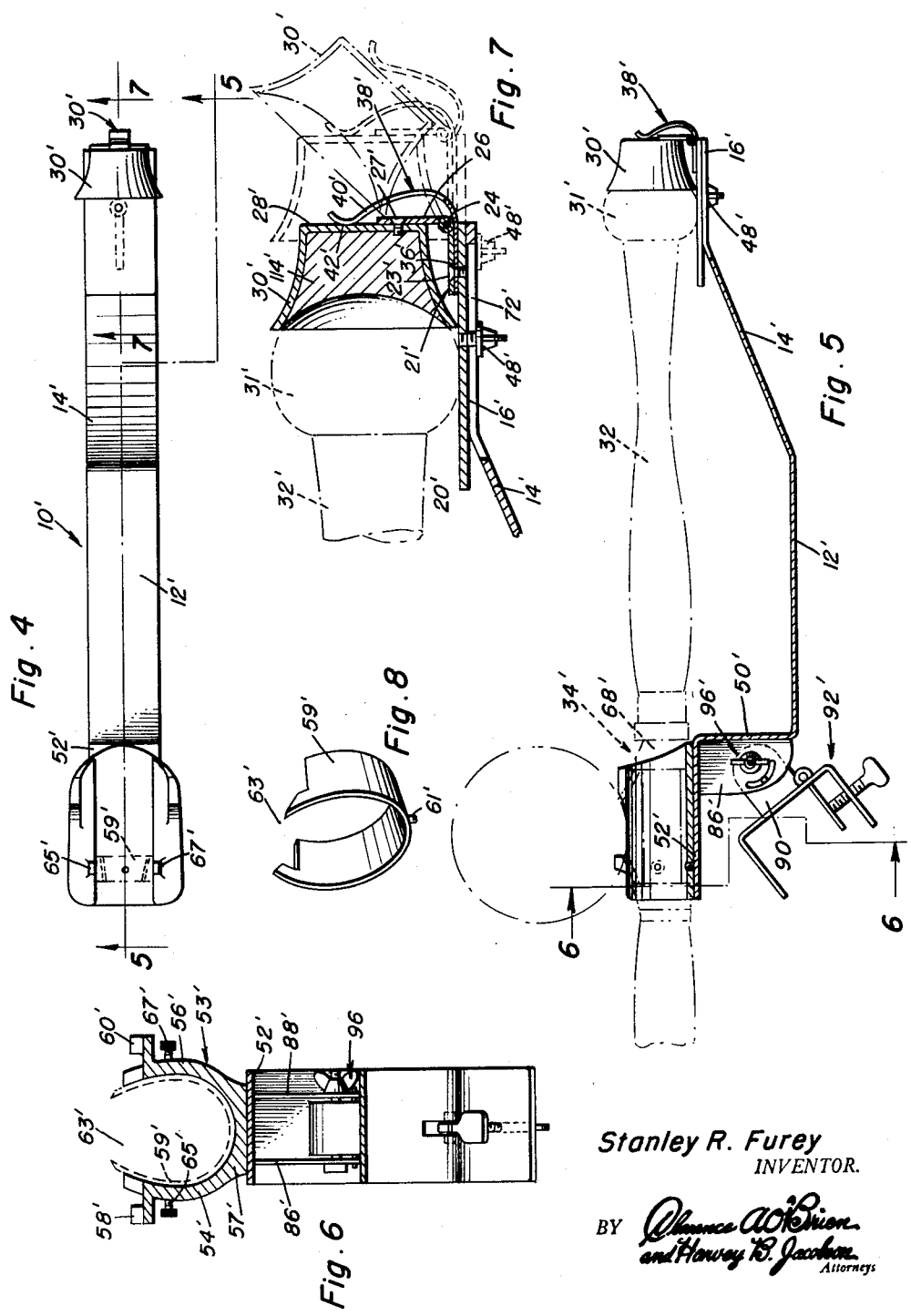
Stanley R. Furey
INVENTOR.

Dec. 15, 1959 S. R. FUREY 2,917,258
FISHING ROD CRADLE
Filed Dec. 28, 1955 3 Sheets-Sheet 3
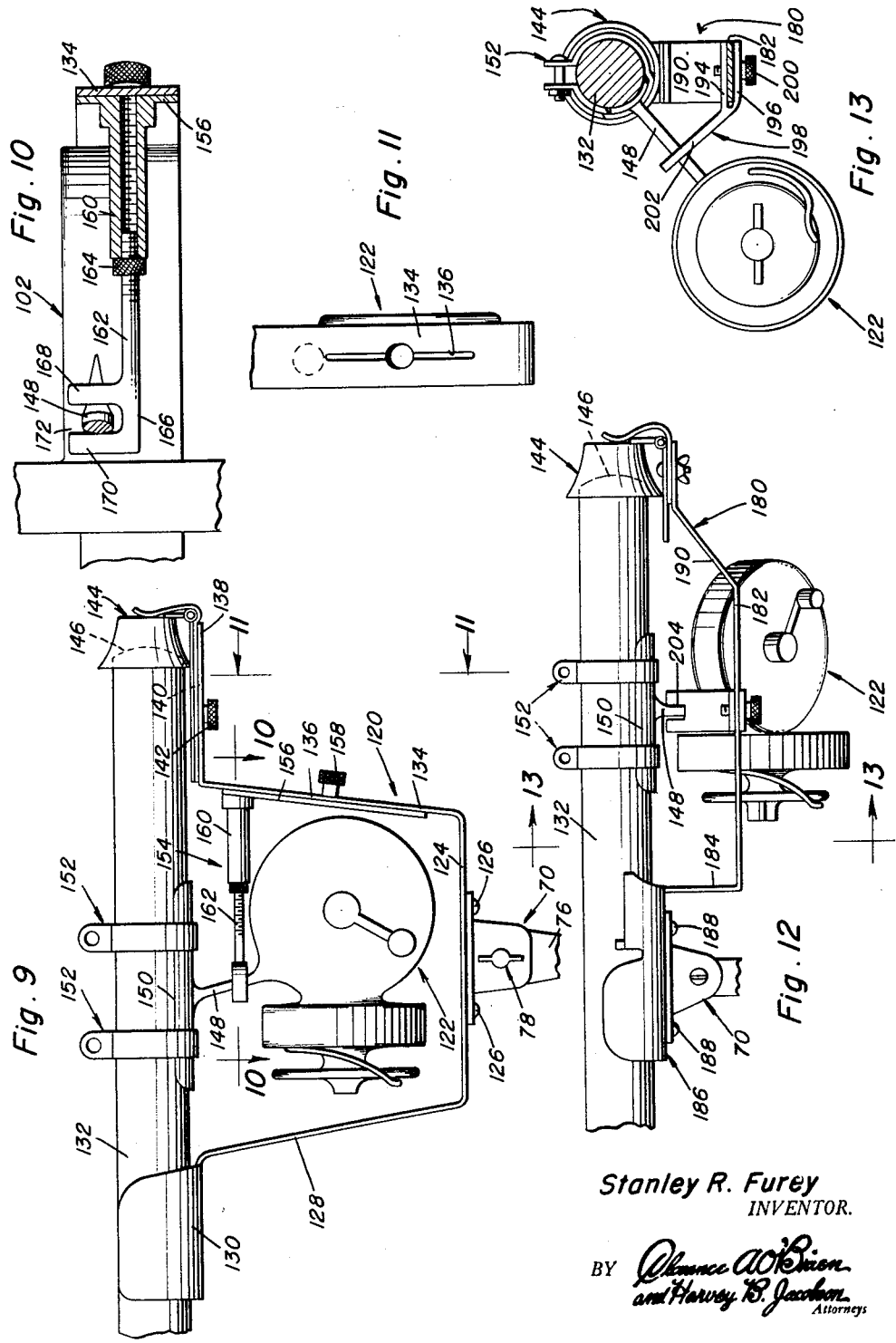
Stanley R. Furey
INVENTOR.

United States Patent Office

2,917,258
Patented Dec. 15, 1959

2,917,258

FISHING ROD CRADLE

Stanley R. Furey, Philadelphia, Pa.

Application December 28, 1955, Serial No. 555,918

2 Claims. (Cl. 248—40)

This invention relates generally to support brackets for fishing rods, and is more particularly concerned with a support bracket removably attachable to a support rail of a boat, raft, platform, etc., wherein said bracket readily and removably supports a fishing rod of the type generally having a reel mounted thereon.

A further object of invention in conformance with that set forth above is to provide a fishing rod support bracket to which the handle of the fishing rod is readily securable, the rod handle being readily removable from said bracket, and in which said bracket is resiliently engaged with a rod handle, and whereupon said bracket is adjustable to various lengthened handles of different fishing rods.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the novel fishing rod bracket;

Figure 2 is a longitudinal sectional view taken substantially on line 2—2 of Figure 1 showing in phantom lines the position of a fishing rod handle;

Figure 3 is a sectional view taken substantially on line 3—3 of Figure 2;

Figure 4 is a top plan view of another embodiment of a novel fishing rod handle bracket;

Figure 5 is a longitudinal sectional view taken substantially on line 5—5 of Figure 4 showing a fishing line handle in phantom lines;

Figure 6 is an enlarged sectional view taken substantially on line 6—6 of Figure 5;

Figure 7 is an enlarged fragmentary sectional view taken substantially on line 7—7 of Figure 4 and showing in phantom lines the alternate positions of the rod and gripping-cap member;

Figure 8 is a perspective view of an insert element cooperating with the bracket of Figure 4 permitting said bracket to accommodate fishing rod handles of varying sizes;

Figure 9 is a side elevational view of another embodiment of fishing rod handle bracket;

Figure 10 is an enlarged fragmentary sectional view taken substantially on the line 10—10 of Figure 9;

Figure 11 is a fragmentary elevational view looking in the direction indicated by the line 11—11 of Figure 9;

Figure 12 is a side elevational view of another embodiment of fishing rod handle bracket; and Figure 13 is a sectional view taken substantially on the line 13—13 of Figure 12.

A rod holding bracket is indicated generally at 10 and includes an elongated portion 12 including on its rear end an upwardly extending portion 14 terminating in a horizontal rear end portion 16. The end portion 16 supports on its upper surface 18 a horizontal support member 20 which includes a longitudinally extending slot 22, the support member 20 having hingedly secured at its rear end 24 a strap element 26 which is secured to the rear surface 28 of a forwardly flared cup-element 30 which surrounds the rear end of a fishing rod handle 32 of the fishing rod assembly indicated generally at 34. The horizontal portion 16 has secured on its lower surface a horizontal leg 36 of a resilient member 38 which includes an upwardly extending resilient leg portion 40 which is engageable at 42 with the rear 28 of the cap member 30. Extending through a slot 44 in portion 36 of the spring member 38 and end portion 16 as well as the slot 22 of the horizontal member 20 is a bolt assembly 46 which includes a wing nut 48 which may be loosened or tightened for adjusting the position of the cap member 38 relative to the horizontal rear end portion 16.

The elongated portion 12 includes at its forward end an upwardly extending portion 50 terminating in a horizontal forwardly extending portion 52, said portion 52 including a pair of upwardly extending side flanges 54 and 56 each of which include an upwardly extending stop pin 58 and 60, respectively, on the upper edge thereof, said flange portions 54 and 56 extending forwardly and terminating into inwardly directed angular portions 62 and 64, respectively, which form a notch portion 66 therebetween. Notch 66 will receive therebetween opposite sides of portion 68 of the rod and reel assembly 34.

Secured on the underside of the elongated member 12 is a support bracket 70, being secured by means of rivets 72, for example, said bracket including a pair of spaced ear elements 74 (only one being shown) which have extending therebetween a support rod 76 having its upper end pivotally secured between the ear portions 74 of the brackets 70 by means of a suitable hand adjustable wing nut and bolt assembly 78. The support rod 76 may be inserted into the ground surface of any tubular support rod along the bank of a body of water or stream. Thus the rod handle support bracket 10 may be adjusted about the wing nut and bolt assembly 78 on the support rod 76.

As seen in Figures 2 and 3, the portion 52 of the bracket includes on its undersurface 80 a bracket element 82 which includes a bight portion 84 secured to said undersurface 80, and having a pair of downwardly extending ear portions 86 and 88 which extend on opposite sides of a connecting ear element 90 of a clamp assembly 92. The bight portion 84 of said bracket 82 is secured on the undersurface 80 of the horizontal portion 52 of the bracket by means of rivets 94, for example. Tubular spacer elements 95 are carried on a wing bolt and nut assembly 96 interposed between the attaching ear 90 and the attaching ears 86 and 88, respectively.

The clamp assembly 92 includes an upper horizontal portion 98 to which the attaching ear 90 is suitably secured, further including a downwardly extending vertical portion 100 terminating in a horizontal portion 102 parallel to the portion 98. A thumb screw 104 is threadedly secured in the horizontal flange 102 and is engageable with a horizontal pressure plate 106 which has an end portion 108 reciprocably supported in a vertically extending slot 110 contained in the vertical portion 100 of the clamp assembly. Through the medium of the thumb screw 104, a gunwale portion 112 is secured between the horizontal portion 98 and the pressure plate 106 of the clamp assembly as seen in Figure 2.

The stop elements 58 and 60 on the upper edge of the flanges 54 and 56, respectively, of the bracket member are engageable with transverse bracing rods which are conventional in a reel of the rod and reel assembly 34.

The cup member 30 may include a suitable resilient pad portion 114 therein for engaging the end of the handle 32 of the rod secured in the bracket.

The rod and reel bracket of Figures 4 through 8 is of the character which will readily accommodate rods and reel generally used in salt water fishing. This rod handle bracket functions in approximately the same manner as that heretofore described.

The rod handle bracket is indicated generally at 10' and includes a horizontal portion 12' which includes a rearwardly extending portion 14' terminating in a rear horizontal support portion 16'. The horizontal portion 16' includes a longitudinally extending slot 22' which has extending therethrough a wing nut element 48' threadedly engaging a horizontal plate member 20'. The plate member 20' has secured on its upper surface a leg 36' of a resilient spring member 38', said leg 36' having positioned thereon a leg 21' by means of a suitable fastening screw 23', for example, the leg 21' having hingedly secured as at 24' a hinge leg 26' which is suitably secured by means of a fastening screw 27', for example, to the rear surface 28' of a handle engaging flared cap element 30'. The cap element 30' is engageable, as seen in Figure 7, with the knob 31' of a handle 32' of a rod and reel assembly 34'. It will be noted that the spring element 38' includes an upwardly extending resilient leg portion 40' which is engageable at 42' with the back 28' of the cap 30. Furthermore, the cap 30' may include therein a suitable cushioning material 114' engageable with the knob 31' of the handle 32'.

The horizontal portion 12' of the handle bracket includes an upwardly extending portion 50' terminating in a forwardly extending support surface portion 52'. Secured in any suitable manner on the upper surface of the support portion 52' is a C-shaped element 53' which includes upwardly extending side flange portions 54' and 56' including lateral stop portions 58' and 60', respectively, functioning in the same manner as the stops 58 and 60 of the embodiment of Figures 1 through 3, the flange portions 54' and 56' being connected by means of a bight portion 57' secured to the upper surface of the horizontal support member 52'. The flange portions 54' and 56' will extend about portion 48' of the rod and reel assembly 34', and in the event this portion is of a reduced diameter, a suitable shim element 59', having a C-shaped cross-section similar to that of the element 53', may be inserted within said element 53', being secured therein by means of a suitable fastening screw 61' extending therethrough and into a suitably tapped portion in the bight portion 57', and by means of lock screws 65' and 67' extending through suitable apertured portions in the flange portions 54' and 56'. The flange portions 54' and 56' define an upwardly opening slot portion 63' for receiving rod portion 68' therein.

Extending downwardly from portions 50' and 52' of the bracket member are connecting ears 86' and 88' which have secured therebetween by means of an ear element 90 and a wing nut assembly 96, is a clamp assembly 92 of the character disclosed in the description of Figures 1 through 3.

Thus it is believed readily apparent that by inserting the rod and reel assemblies 34 and 34', respectively, into the respective rod handle holding assemblies, the cap elements 30 and 30' may be respectively adjusted by means of the wing nuts 48 and 48', whereupon the handle of the rod and reel assemblies will be retained in said brackets. Thereafter, said clamp assemblies 92 may be utilized for securing said rod handle brackets to a suitable support, or a support rod 76 may be utilized as previously described. The rod and reel assemblies 34 and 34' may be readily removed from their respective support bracket, whereupon upward movement as indicated by the dotted arrow of Figure 2, results in overcoming the spring tension of the spring leg 40' as most readily seen in Figure 7, whereupon the cap member is pivoted in a clockwise direction permitting the ready removal of the handle 32 or 32'.

Considering Figures 9 through 11, there is disclosed a support bracket 120 for supporting a spinning reel assembly 122.

The bracket 120 includes a lower horizontal portion 124 which supports by means of suitable fasteners 126 a depending support bracket 70 incorporating the support rod 76 and a bolt and nut assembly 78 as previously disclosed with respect to Figure 2.

The horizontal portion 124 includes a forward upwardly extending portion 128 terminating in an upwardly opening U-shaped bracket element 130 extendable on opposite sides of an intermediate portion of a fishing rod 132. The horizontal portion 124 includes a rear upwardly extending portion 134 with a vertical slot portion 136 therethrough, for a purpose to subsequently become apparent, said portion 134 continuing as a horizontal support portion 138. The portion 138 includes a longitudinally extending slot portion 140 receiving therethrough one end of a retaining screw 142 for reciprocably and adjustably supporting an outwardly flared and resiliently urged cap assembly indicated generally at 144 for engaging the end 146 as previously mentioned with respect to the previously disclosed embodiments.

The spinning reel 122 incorporates a support foot portion 148 terminating in an elongated arcuate connecting bracket 150 which has opposite ends suitably secured on the fishing rod 132 by means of conventional clamp assemblies 152.

In order to retain the spinning reel assembly 122 in a substantially stabilized position within the support bracket 120, a brace assembly 154 is provided, said brace assembly 154 including a plate portion 156 juxtaposed on the portion 134 and having a suitable tapped portion therein which receives a clamping screw 158, said screw 158 extending through the slot portion 134 of the support bracket. Suitably secured at the upper end of plate portion 156 is an angularly related integral and internally threaded support sleeve 160 which receives the threaded end 162 of a connecting element, said threaded end 162 being secured in the sleeve 160 by means of a lock nut 164 circumposed thereon, see Figure 10. The portion 162 terminates in a laterally extending head portion 166 including a pair of spaced foot elements 168 and 170 defining a notch 172 extendable about the portion 148 of the spinning reel assembly.

Considering Figures 12 and 13, the spinning reel assembly is indicated generally at 122, said assembly being supported in a support bracket indicated generally at 180, the spinning reel assembly including a support foot portion 148 and including an integral elongated connection portion 150 suitably secured on the rod 132 by means of the securing clamps 152.

As clearly seen in Figure 13, the spinning reel assembly 122 will extend laterally or in angular relationship from the rod 132 when considered with respect to the support bracket 180.

The support bracket 180 includes a horizontal portion 182 terminating in an upwardly extending forward portion 184, said portion 184 terminating in an angularly related U-shaped portion 186 suitably conformed to extend around an intermediate portion of the rod 132. If desired, a suitable support bracket indicated generally at 70 may be secured by means of suitable fastening elements 188 in depending relationship on the portion 186 of the support bracket.

The portion 182 of the support bracket includes a rearwardly and upwardly extending portion 190 terminating in an outwardly flared and resiliently urged cup assembly 144 for engagement with the rear end 146 of the rod 132. The aforementioned resiliently urged cup structure is of the character described with respect to the previously mentioned embodiments of invention.

The horizontal portion 182 of the bracket 180 is suitably apertured and has extending on opposite sides thereof parallel portions 194 and 196 of a stabilizing bracket assembly indicated generally at 198. The portions 194 and 196 have aligned apertures extending therethrough and extending through the apertures in the portions 182, 194 and 196 is a suitable locking screw 200. The portions 194 and 196 continue as an upwardly extending integral arm 202 which is bifurcated at its ends providing a notch portion 204 which extends around an intermediate portion of the foot portion 148 of the spinning reel assembly, thus stabilizing the assembly with respect to the support bracket 180.

Various positional directional terms such as "front," "rear," "side," etc. are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing rod holder comprising a rigid bracket adapted to cradle and support the handle of a fishing rod in such a way that the handle is unobstructed and readily accessible with a view toward giving the fisherman unhampered access thereto, said bracket being generally U-shaped in side view and having an elongated horizontal portion which is adapted to underlie the handle and which assumes a position downwardly spaced from the cradled handle, having an upwardly extending rear limb terminating at an upper end in a rearwardly extending horizontal hinge and bracket supporting portion, said support portion being disposed in a plane spaced above and parallel to the horizontal portion, said bracket also having an upstanding forward limb, a saddle supported on the upper end of the forward limb and disposed in a plane generally common to the plane of said horizontal support portion and embodying spaced opposed cooperating flanges defining a confining seat for readily removable reception of the cooperating portion of said handle, the upper lengthwise edges of said flanges being provided with cooperating upstanding stop elements which when engaged with a reel which is mounted on the handle, serve to minimize the likelihood of movement and displacement of the handle in a direction forwardly relative to the over-all bracket, a hinge having vertical and horizontal pivotally connected elements, said horizontal element being slidably mounted atop said horizontal support portion, a relatively deep circular cup open on a forwardly facing side and closed on the rearwardly facing side and providing a receiver which is adapted to telescopically receive and temporarily retain the butt end only of said handle, said cup, when in normal use, being disposed in a vertical plane at right angles to the plane of said horizontal support portion and said vertical hinge element being opposed to and secured to the closed side of the cup, a leaf spring having one end which is horizontal and secured to said horizontal support portion and the other end vertical and pressing yieldingly against the closed side of said cup, and means carried by said bracket functioning to mount the bracket, if desired, on stationary support means, and manually adjustable means adjustably and also detachably mounted on the rearward limb and extending laterally therefrom into the space between the forward and rearward limbs and disposed in a plane below the respective upper ends of said limbs in order to occupy a position beneath an overlying portion of said handle, said means having a forked head at a forward end thereof which is adapted to be cooperatively and releasably engaged with a retaining member for a spinning reel such as, for example, is adapted to be located in a position in proximity to said bracket.

2. A fishing rod holder comprising a rigid bracket adapted to cradle and support the handle of a fishing rod in such a way that the handle is unobstructed and readily accessible with a view toward giving the fisherman unhampered access thereto, said bracket being generally U-shaped in side view and having an elongated horizontal portion which is adapted to underlie the handle and which assumes a position downwardly spaced from the cradled handle, having an upwardly extending rear limb terminating at an upper end in a rearwardly extending horizontal hinge and bracket supporting portion, said support portion being disposed in a plane spaced above and parallel to the horizontal portion, said bracket also having an upstanding forward limb, a saddle supported on the upper end of the forward limb and disposed in a plane generally common to the plane of said horizontal support portion and embodying spaced opposed cooperating flanges defining a confining seat for readily removable reception of the cooperating portion of said handle, the upper lengthwise edges of said flanges being provided with cooperating upstanding stop elements which when engaged with a reel which is mounted on the handle serve to minimize the likelihood of movement and displacement of the handle in a direction forwardly relative to the over-all bracket, a hinge having vertical and horizontal pivotally connected elements, said horizontal element being slidably mounted atop said horizontal support portion, a relatively deep circular cup open on a forwardly facing side and closed on the rearwardly facing side and providing a receiver which is adapted to telescopically receive and temporarily retain the butt end only of said handle, said cup, when in normal use, being disposed in a vertical plane at right angles to the plane of said horizontal support portion and said vertical hinge element being opposed to and secured to the closed side of the cup, a leaf spring having one end which is horizontal and secured to said horizontal support portion and the other end vertical and pressing yieldingly against the closed side of said cup, and means carried by said bracket functioning to mount the bracket, if desired, on the stationary support means, a spinning reel retaining and stabilizing bracket embodying an arm adapted to assume an outstanding angular position relative to the horizontal portion of said U-shaped bracket, said arm having an upper end which is bifurcated to provide a fork, said fork adapted for cooperative and retentive association with a complemental part of a spinning reel, and said arm being provided at the other end with means straddling and detachably mounted on said horizontal portion, said means allowing the stabilizing bracket to be applied and removed quickly and, wherever necessary or desired, shifted along the horizontal portion for correct positioning needs.

References Cited in the file of this patent

UNITED STATES PATENTS

| | | |
|---|---|---|
| 442,585 | Huppmann | Dec. 9, 1890 |
| 1,035,739 | Raes | Aug. 13, 1912 |
| 2,289,592 | Riedi | July 14, 1942 |
| 2,317,445 | Davidson et al. | Apr. 27, 1943 |
| 2,314,747 | White | Mar. 23, 1943 |
| 2,446,282 | Hart | Aug. 3, 1948 |
| 2,537,456 | Goss | Jan. 9, 1951 |
| 2,693,332 | Albert | Nov. 2, 1954 |